(12) United States Patent
Varghese

(10) Patent No.: US 8,804,822 B2
(45) Date of Patent: Aug. 12, 2014

(54) I-FRAME SIZE ESTIMATION BASED ON EDGE STRENGTH

(75) Inventor: Gijesh Varghese, Santa Clara, CA (US)

(73) Assignee: Geo Semiconductor Inc., Santa Clara, CA (US)

( * ) Notice: Subject to any disclaimer, the term of this patent is extended or adjusted under 35 U.S.C. 154(b) by 579 days.

(21) Appl. No.: 12/904,005

(22) Filed: Oct. 13, 2010

(65) Prior Publication Data

US 2012/0093219 A1    Apr. 19, 2012

(51) Int. Cl.
*H04N 11/02*    (2006.01)
*H04N 7/26*    (2006.01)

(52) U.S. Cl.
CPC .... *H04N 19/00157* (2013.01); *H04N 19/00266* (2013.01); *H04N 19/00181* (2013.01); *H04N 19/00357* (2013.01); *H04N 19/00218* (2013.01); *H04N 19/00096* (2013.01)
USPC ............. 375/240.03; 375/240.18; 375/240.24

(58) Field of Classification Search
None
See application file for complete search history.

(56) References Cited

U.S. PATENT DOCUMENTS

| | | | |
|---|---|---|---|
| 8,135,062 B1* | 3/2012 | Cote | 375/240.03 |
| 2005/0175091 A1* | 8/2005 | Puri et al. | 375/240.03 |
| 2009/0213930 A1* | 8/2009 | Ye et al. | 375/240.03 |

OTHER PUBLICATIONS

Z. Cui and X. Zhu, "Image Complexity Adaptive Intra-Frame Rate control Algorithm for H.264/AVC," Proc. of IEEE WCSP, Nanjing, China, 2009, pp. 1-5.*
Limin Wang, "Bit Rate Control for Hybrid DPCM/DCT Video Codec", IEEE Transactions on Circuits and Systems for Video Technology, vol. 4, No. 5, Oct. 1994.*
L. Tian, X. Yin, Y. Sun and S. Sun, "Accurate bit prediction for intra-only rate control", IEEE International Conference on Multimedia and Expo, 2009. ICME 2009., p. 41-44.
Y. Sun, Y. Zhou, Z. Feng, Z. He and S. Sun, "Incremental rate control for H.264/AVC video compression," IET Image Processing, 2009, vol. 3, No. 5, pp. 286-298.

* cited by examiner

*Primary Examiner* — Sath V Perungavoor
*Assistant Examiner* — Dakshesh Parikh
(74) *Attorney, Agent, or Firm* — Sughrue Mion, PLLC

(57) ABSTRACT

Various embodiments of the present invention relate to systems, devices and method of video encoding that select a quantization parameter set based on a global edge strength value and an available bitrate for a corresponding compressed frame. Quantization parameters are selected using a mathematical correlation between the global edge strength value of the I-frame and an available bitrate/maxim target frame size for the corresponding compressed frame.

24 Claims, 6 Drawing Sheets

I-FRAME SIZE ESTIMATION BASED ON EDGE STRENGTH

BACKGROUND

A. Technical Field

The present invention relates to video encoding, and in particular, to the selection of a quantization parameter for an I-frame based on a global edge strength value of the frame and an available bitrate for its corresponding compressed frame.

B. Background of the Invention

Video images are compressed to reduce the bandwidth needed for transmission via broadcast services, wireless systems, internet or local area network. Transmission is implemented in a way such that a balance is managed between the quality of compression for a particular frame and the amount of bits used to compress the frame.

One factor that determines the bit size of a compressed video frame is a lossy quantization process that reduces the amount of data used to encode the original representation. A set of quantization parameters define how the quantization process is performed and the amount of data lost during the procedure. The latest international video codec standard H.264 or MPEG-4 provides 52 sets of quantization parameters, each associated with different visual quality and frame size.

Transmission rate control is used in a video encoding system which normally comprises three major functional blocks: a reference decoder, a parameter selector, and a video encoder. The reference decoder receives feedback from the encoder and constrains the bitrate according to the status of the decoder buffer. The incoming frame is compressed to a preferred size so that the frame is transmitted at the specified bitrate without causing buffer overflow or underflow. Consequently, given a target frame size, a parameter selector is needed to select a proper quantization parameter set from the list of quantization parameters identified by the video codec standard in use. Since the frames sizes associated with the available quantization parameters are discrete values, the selected quantization parameters set may only lead to a preferred frame size not exceeding the allowed size. An error in quantization parameters selection may result in an undesirable number of bits of a video frame being encoded and may cause a buffer overflow or underflow.

A typical method in selecting quantization parameters is to extrapolate the quantization parameters for the current frame from a previously encoded frame(s); however, the underlying assumption that the current and previous frames share the same complexity may induce a high probability of error. Such error may be accommodated by the reference decoder if no significant scene change is involved. However, even without any scene change, an increase in content complexity may still produce estimation error for an intra frame (I-Frame). Moreover, in real time encoding applications, the encoder is restricted to run only a single pass (frame).

Accordingly, what is needed is a system and method that addresses the above described shortcomings in the prior art.

SUMMARY OF THE INVENTION

Various embodiments of the present invention relate to systems, devices and method of video encoding that select a quantization parameter set based on a global edge strength value and an available bitrate for a corresponding compressed frame. As a result, quantization parameters for an I-frame are selected based on the characteristics of the frame itself without relying on prior frame characteristics which may change from scene-to-scene.

Certain embodiments of the video encoding system include a reference decoder, a rate quantization model module and a video encoder. The rate quantization model module relies on a global edge strength (GE) value which is identified during preprocessing of the frame and an available bitrate dependent on the status of a buffer(s) within the reference decoder.

Quantization parameters are selected using a mathematical correlation between the global edge strength value of the I-frame and a target frame size for the corresponding compressed frame. In particular, quantization parameters are selected for a particular frame based on a global edge strength value, generated during preprocessing of the particular frame, and a target frame size provided by the reference decoder buffer. The selected quantization parameters allow a preferred quality of compression of the I-frame to be maintained while still operating within the available bitrate provided by the reference decoder. One skilled in the art will recognize that the manner in which a frame's global edge strength value is calculated may be achieved using various methods, all of which are intended to fall within the scope of the present invention. Additionally, one skilled in the art will recognize that various methods may be employed in the selection of a quantization parameter(s) of an I-frame based on its global edge strength value and an available bitrate, all of which are intended to fall within the scope of the present invention.

Certain features and advantages of the invention have been generally described in this summary section; however, additional features, advantages, and embodiments are presented herein or will be apparent to one of ordinary skill in the art in view of the drawings, specification, and claims hereof. Accordingly, it should be understood that the scope of the invention shall not be limited by the particular embodiments disclosed in this summary section.

BRIEF DESCRIPTION OF THE DRAWINGS

Reference will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments.

DETAILED DESCRIPTION OF THE PREFERRED EMBODIMENTS

Embodiments of the present invention provide systems, devices and methods for video encoders and are particularly related to the selection of quantization parameters employed therein. In the following description, for purposes of explanation, specific details are set forth in order to provide an understanding of the invention. It will be apparent, however, to one skilled in the art that the invention can be practiced without these details. One skilled in the art will recognize that embodiments of the present invention, described below, may be performed in a variety of ways and using a variety of structures. Those skilled in the art will also recognize additional modifications, applications, and embodiments are within the scope thereof, as are additional fields in which the invention may provide utility. Additionally, various embodiments of the invention may be realized in hardware, firmware, software or a combination thereof. Accordingly, the embodiments described below are illustrative of specific embodiments of the invention and are meant to avoid obscuring the invention.

Reference in the specification to "one embodiment" or "an embodiment" means that a particular feature, structure, characteristic, or function described in connection with the embodiment is included in at least one embodiment of the invention. The appearances of the phrase "in one embodiment" in various places in the specification are not necessarily all referring to the same embodiment.

Figure 1:
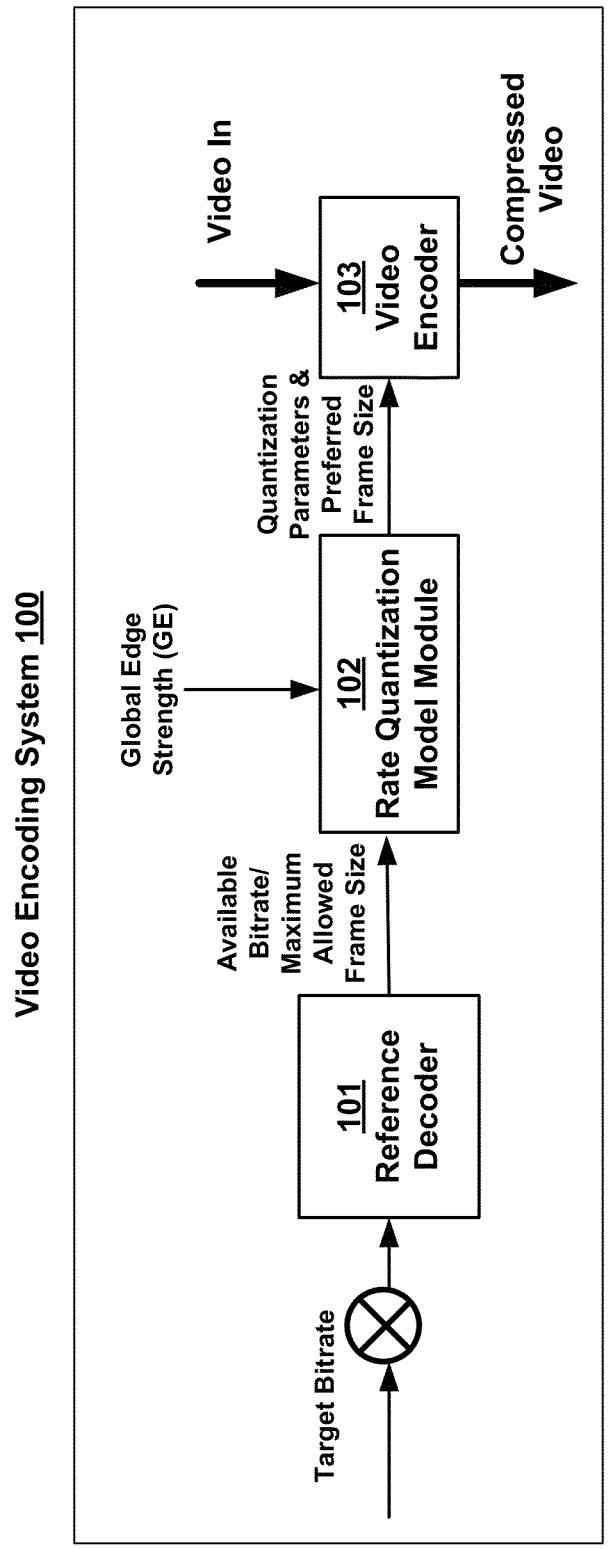
FIG. 1 illustrates a block diagram of a video encoding system using externally generated global edge strength according to various embodiments of the invention.

FIG. 1 illustrates a block diagram 100 of a video encoding system using a global edge strength value generated during preprocessing of a frame according to various embodiments of the invention. The video encoding system includes a reference decoder (RD), a rate quantization (RQ) model, and a video encoder. The bitrate is predetermined for the communication channel and this video encoding system is constructed under the assumption that the bitrate is always controlled within the tolerance.

The reference decoder 101 is particularly used to constrain how fast the bitstream data may be generated from the encoder 103 and how much buffering of the bitstream and encoded picture is required. The limit of a frame size is identified according the allowed bitrate. An internal buffer in the reference decoder stores excessive information temporarily for a frame whose size exceeds the limit; however, if the frame size is too large, it has to be dropped. The management of this bitrate is important as a significantly lossy channel may result from various factors resulting in frames being dropped or transmission delays caused by buffer underflow.

The rate quantization model module 102 generates quantization parameters related to quantization operations performed within the video compression/encoding process. In prior art single-pass or multi-pass video encoding system, quantization parameters for a specific frame are generated based on the information of previous frames. In particular, quantization parameters are derived for an intra-coded frame (I-frame) by averaging quantization parameters of the previous group of pictures (GOP). However, if the current group of pictures demonstrates no correlation with the former group, this quantization model module may lead to errors.

In various embodiments of the invention, the rate quantization model module 102 selects a quantization parameter(s) for a frame based on an input parameter called global edge strength. This rate quantization model module is easy to implement compared to conventional models, and the process is independent of the frame history and based on the present frame. The rate quantization model module 102 is also less correlated with content type or content changes of a scene or motion across multiple frames.

Figure 2:
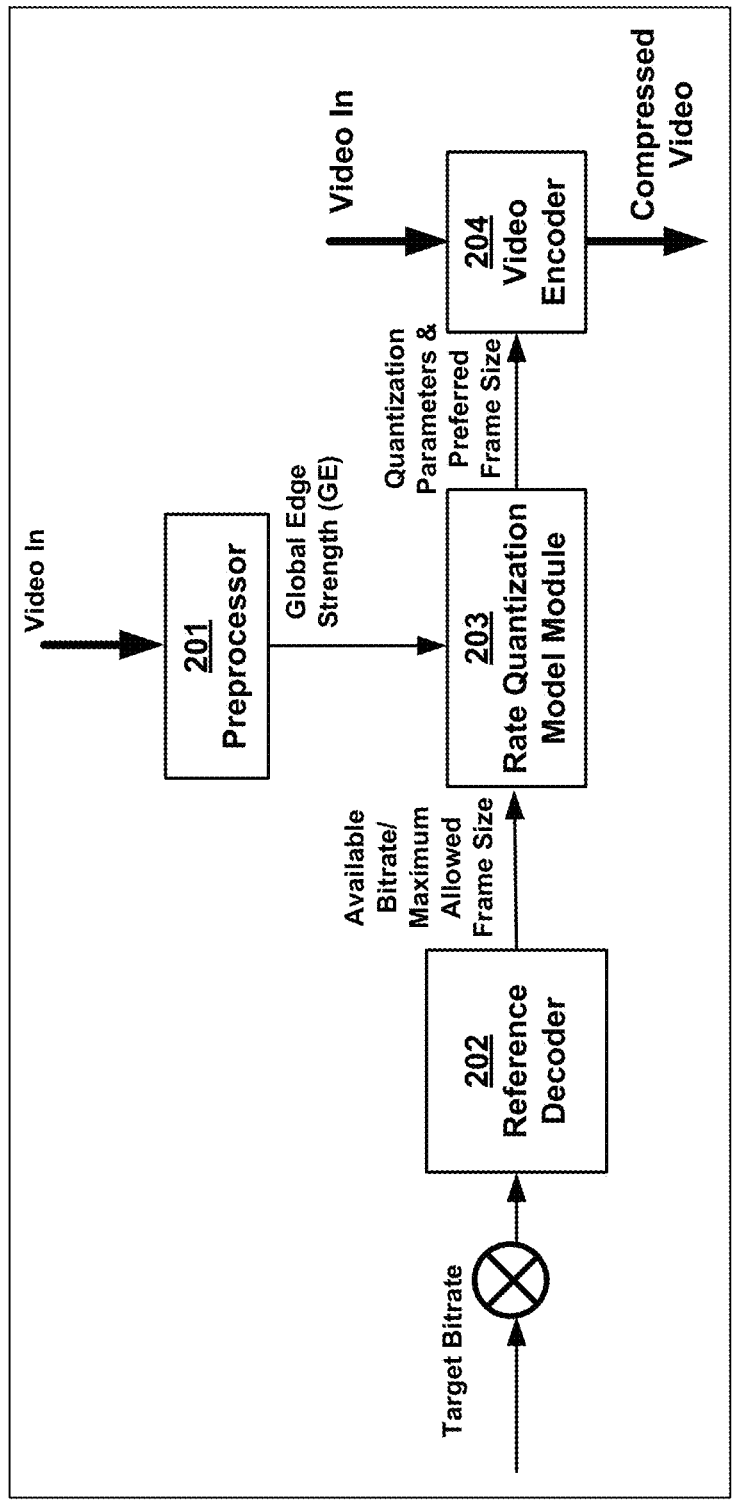
FIG. 2 illustrates a block diagram of a video encoding system using internally generated global edge strength according to various embodiments of the invention.

FIG. 2 illustrates a block diagram 200 of a video encoding system that further comprises a preprocessor 201 to generate global edge strength value. One skilled in the art will recognize that this global edge strength value may be generated within a preprocessor in the video encoding system or a processor located external to the system. The rate quantization model module 203 identifies the target quantization parameters based on the maximum allowed frame size provided by reference decoder 202 and the global edge strength provided by 201, respectively. The video frame is compressed based on the quantization parameters in the video encoder 204, similarly as in the encoder 103 for the video encoding system 100.

In certain embodiments, global edge strength (GE) is computed using edge detection, an image processing tool in signal processing to identify points where the image brightness changes sharply or has discontinuities. The gradient of image intensity at each point in a frame is mathematically represented as a Sobel Kernel. The Sobel edge strength (SE) of a point located at (x,y) is represented as $$SE(x, y) = \sum_{i=-1}^{1} \sum_{j=-1}^{1} S(i, j) I(x-j, y-j) \tag{1}$$

where S(i,j) is the Sobel kernel and I(x,y) is the image. For each pixel the Sobel edge strength is computed for vertical, horizontal and the two diagonal directions. The Sobel kernel for horizontal direction is given below and the kernel for each of the other directions is obtained by rotating the horizontal kernel appropriately.

$$\begin{pmatrix} -1 & 0 & 1 \\ -2 & 0 & 2 \\ -1 & 0 & 1 \end{pmatrix}$$

The average edge strength ($SE_{mb}$) for a macroblock is computed as the average of the Sobel edge strength of all the points. In codecs using H.263 and H.264, the overarching macroblock size is fixed at 16×16 pixels and the average edge strength $SE_{mb}$ is derived as $$SE_{mb}(k) = \frac{1}{256} \sum_{i=0}^{15} \sum_{j=0}^{15} |SE(i, j)| \tag{2}$$

Global edge strength (GE) of the entire video frame is defined as the sum of the average edge strengths of all macroblocks $$GE = \sum_{k=0}^{N-1} SE_{mb}(k) \tag{3}$$

where N is the total number of macroblocks in a video frame.

One Skilled in the art will recognize that alternative edge detection operators, such as Prewitt, Canny or Gradient edge detectors, may be employed to obtain global edge strength and that above-described operator, Sobel Kernel, is intended to be an example.

Figure 3:
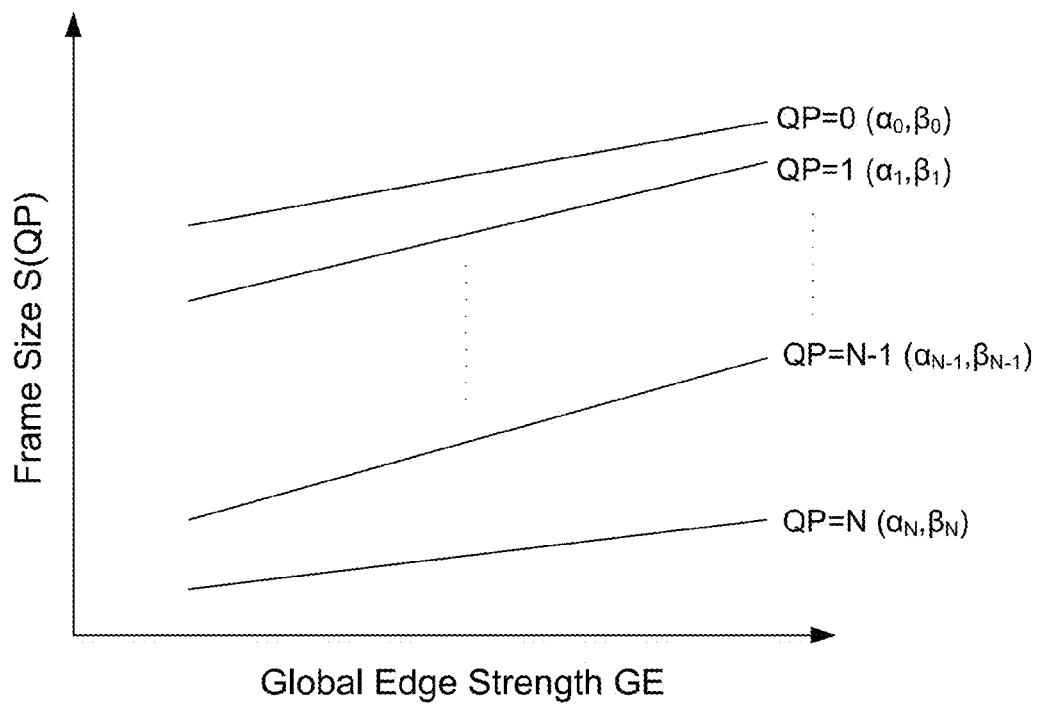
FIG. 3 illustrates the linear correlations of the frame size and global edge strength according to various embodiments of the invention.

The frame size and global edge strength demonstrate linear correlations as shown in FIG. 3. At a given quantization setup, the linear approximation between the frame size (S) and the global edge strength (GE) is represented as $$S(QP)=\alpha_i * GE + \beta_i \qquad (4)$$

where $\alpha_i$ and $\beta_i$ are constants that depend on the applied quantization parameters at a specific level i. For example, since the H.264 standard has 52 levels of quantization, 52 linear correlations exist for a H.264 video encoding system. The exact values of the constants α and β are dependent on various encoding parameters such as quantization matrix, dead zone matrix and entropy coding mode, and most of these parameters are constants predetermined by the encoding setup.

Figure 4:
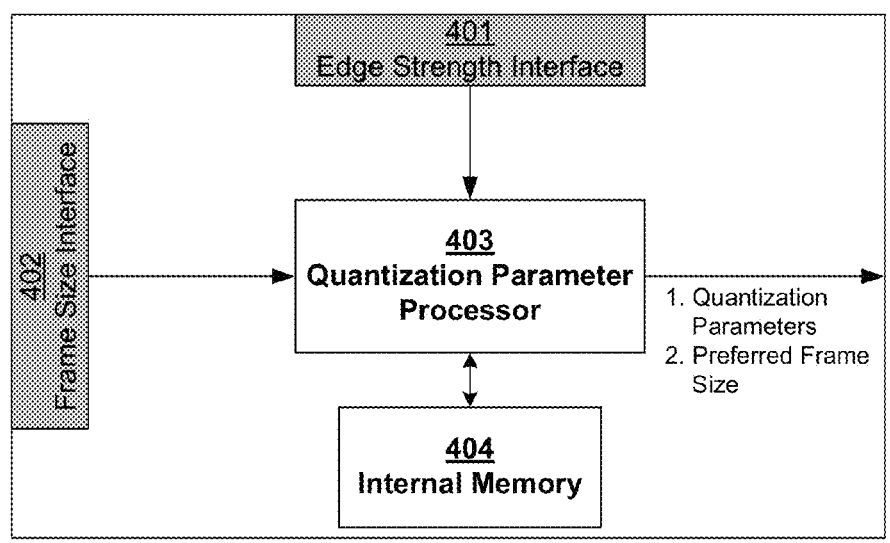
FIG. 4 illustrates a rate quantization model module based on global edge strength according to various embodiments of the invention.
Figure 5:
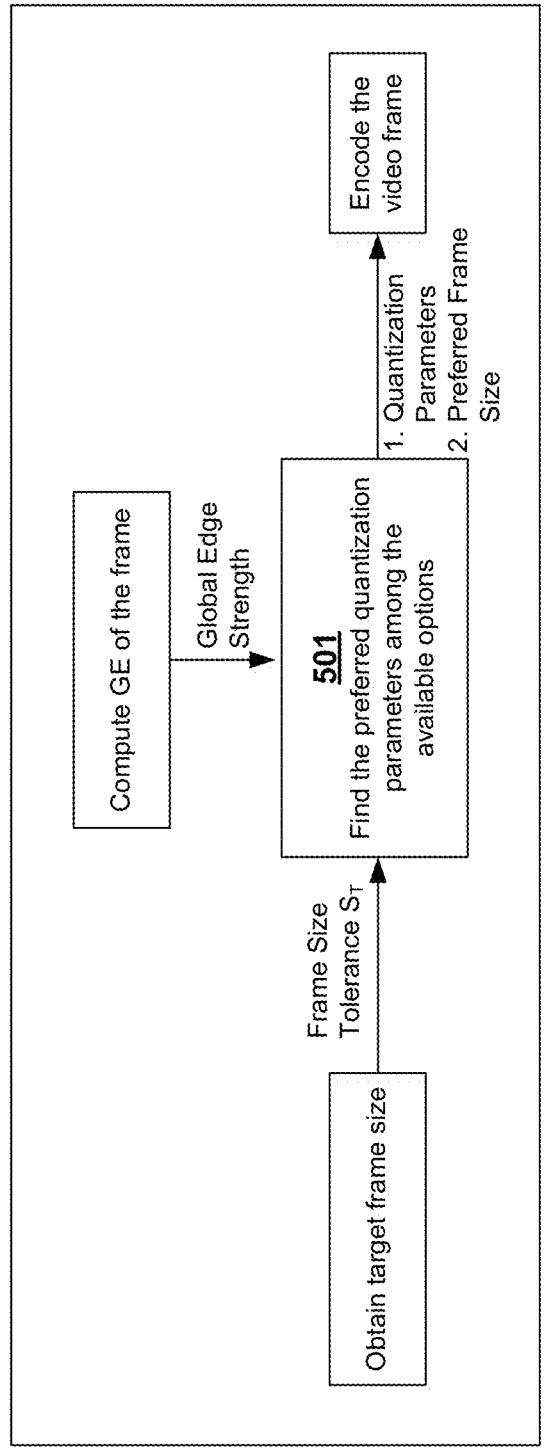
FIG. 5 illustrates a flow diagram showing the method and data path to identify the preferred frame size and quantization parameters according to various embodiments of the invention.

FIG. 4 is a block diagram 400 illustrating a rate quantization model module that uses global edge strength and a target frame size (or target bit rate). FIG. 5 is a flow diagram 500 illustrating the corresponding method and data path to identify the preferred frame size and quantization parameters. Frame size interface 402 provides the target frame size or bitrate (and may also include tolerance) generated by the reference coder 101 or 202 while the global edge strength value is provided by the edge strength interface 401. A quantization parameter processor 403 is the core component to apply a specific method and select a preferred quantization parameters from the list in relation to the global edge strength value and the target frame size (or bitrate). An internal memory 404 is used to store the list of quantization parameters, list of constants (α and β) and intermediate data that the processor 403 needs.

The method used in the processor 403 may be implemented by identifying a preferred quantization parameter that best fits a correlation between the global edge strength of a frame to a target frame size, or frame size range as defined by tolerance of the system. For each set of quantization parameters, a specific frame size exists to obtain the known global edge strength as required for the frame. A preferred set of quantization parameters may result in a frame size which deviates least from the maximum size or only needs to fall within a certain range of the maximum frame size. Once the standard is specified, several methods are applicable for an efficient search for the optimal quantization parameters in 501. Two examples of such methods are provided below:

(1) A sequential search causes an analysis of each potential set of quantization parameters relative to both the global edge strength and target frame size. In each search step, the frame size is first computed for the specific quantization parameters, and if the difference between the allowed frame size and the computed size is positive, the difference is compared to the minimum size difference previously stored in the memory. A smaller difference replaces the stored value; otherwise, the search moves forward to the next quantization setup. The comparison and storage process is repeated till all the quantization parameters are verified and the best set of quantization parameters are selected. A sample method used in a H.264 video encoding system is given below.

```
tagretQP ← 0
intra_size ← α₀*GE+β₀
minimum_difference←|intra_size−TargetSize|
for QP=1 to 51 do
    intra_size ← α_QP*GE+β_QP
    difference←|intra_size−TargetSize|
```
    if minimum_difference≥ difference then
        minimum_difference ← difference
        targetQP ← QP
    end if
end for
```

The frame size normally decreases monotonically as the quantization index increases, for example, in the H.264 encoding system where the indexes changes within the range of 0 to 51. In a H.264 encoding system, the sequential search may be terminated when the frame size increases above the tolerance if the index decreases from 51 or decreases below the tolerance if the index increases from 0. Efficiency of the sequential search is dramatically enhanced in such monotonic system.

(2) An iterative search. Although an iterative search is not required to start from any specific location in the list of quantization parameters, the first or last quantization parameters are normally used as the start. For example, in a H.264 encoding system, the search may start from the first set of quantization parameters. If the computed frame size is larger than the maximum allowed frame size, the comparison is repeated for the last ($52^{nd}$) set of quantization parameters. Two index numbers (index_max and index_min) are stored in the memory, one for the last better-than-tolerance quantization and the other for the last worse-than-tolerance quantization. The subsequent iteration moves to the quantization setup whose index averages those two stored indexes and then refreshes them after the iteration. Once these two stored indexes are successive integers, the iteration may terminate and the quantization parameters identified by the higher index (index_max) should be used. Table 1 shows the steps to identify the $15^{th}$ quantization parameters as preferred in a H.264 encoding system. This iterative search only needs eight iterations to identify the target quantization parameters. Despite the relative complexity of process, the iterative search is oftentimes more efficient and faster than the sequential search.

TABLE 1

An example of an iterative search in H.264 encoding systems

| Index | 0 → | 51 → | 25 → | 12 → | 19 → | 15 → | 13 → | 14 |
|---|---|---|---|---|---|---|---|---|
| Frame size versus the tolerance | > | < | < | > | < | < | > | > |
| Index_max | | 51 | 25 | | 19 | 15 | | |
| Index_min | 0 | | | 12 | | | 13 | 14 |

One skilled in the art will recognize that various iterative methods may be employed in the search and that the above-described methods are intended to be two examples.

An alternative method applicable in the processor 403 is implemented by identifying the preferred quantization case as having a frame size the same as the tolerance while the global edge strength is only better than actual. This method is based on the fact that all the correlations in FIG. 3 demonstrate positive linearity. If the maximum allowed frame size corresponds to a certain global edge strength, a smaller global edge strength only requires a smaller frame size. To compute the global edge strength GE for each quantization case, the formula (4) is adjusted as $$GE(QP)=\alpha_i * S_T + \beta_i \qquad (5)$$

where $\alpha_i$ and $\beta_i$ are constants associated with the quantization parameters and $S_T$ is the frame size tolerance. Mathematically, the computed global edge strength may even be less than zero, which is impractical in reality and just indicates that the specific quantization may not be accomplished using such a frame size. For a frame having maximum allowed size, the optimal quantization parameters allow better global edge strength while resulting in the least deviation from the actual strength. The actual frame size and image details are maximized.

The method in FIG. 5 of identifying the quantization parameters and frame size is valid and effective except for the cases in which the faint edges in the video frame may not be described accurately using the Sobel edge strength in formula (I). This anomalous case is observed in flat video frames with very low frequency information. If more than 50% of the microblocks have zero edge strength, this method based on global edge strength estimation is less accurate. In most cases, the actual frame size tends to be 1.5 times the predicted size; therefore, the linear correlation between the frame size and the global edge strength has to be adjusted to accommodate the anomalous cases.

The preprocessor 201 may integrate additional function blocks which set a threshold value on the binsize of the lower edge strength and count the macroblocks having edge strengths lower than the threshold. Once more than 50% of the macroblocks have zero edge strength, adjustment is automatically applied to the estimated frame size generated by the processor 403. Despite various applicable mathematical methods, a suggested adjustment is to apply a scale of 1.5 for the computed frame size before comparing it to the maximum allowed frame size. The adjusted frame size is used for the search process 501 to identify preferred quantization parameters. As a result, most of the 20% error rate may be eliminated by this adjustment.

As previously stated, the present invention may be implemented in hardware, firmware, software or combination thereof. For example, the functions to practice various aspects of the present invention may be performed by components that are implemented in a wide variety of ways including discrete logic components, one or more application specific integrated circuits (ASICs), and/or program-controlled processors. It shall be noted that the manner in which these items are implemented is not critical to the present invention.

Figure 6:
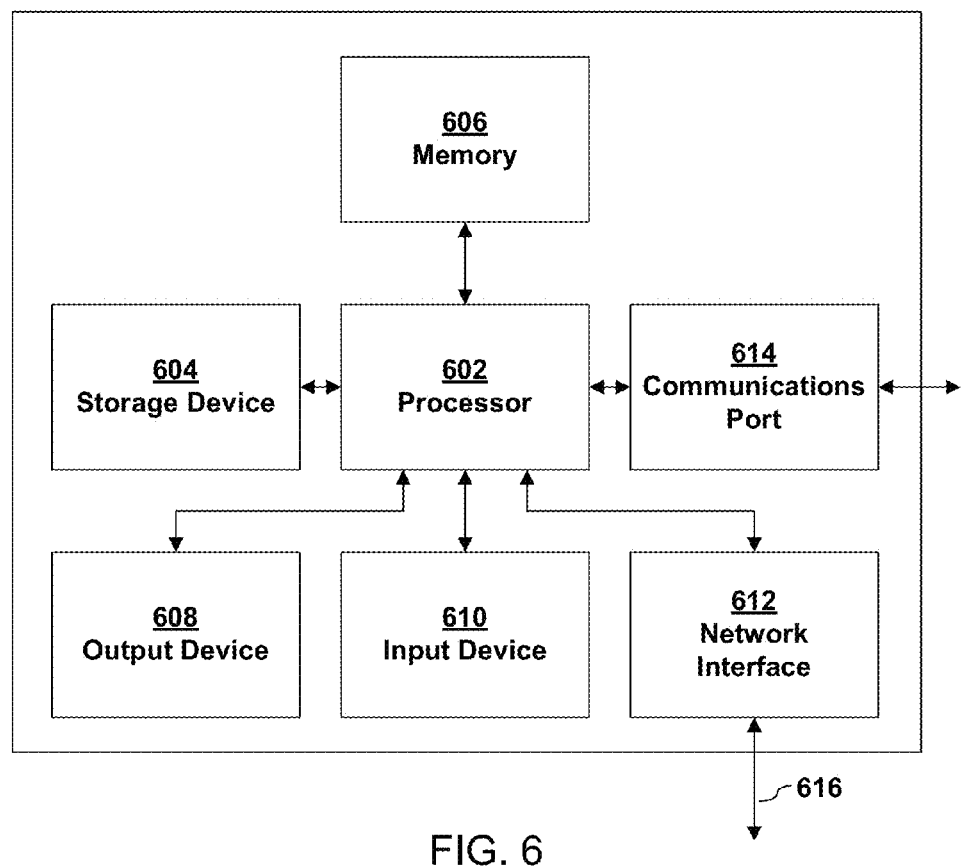
FIG. 6 depicts a block diagram of an example of a computing system according to embodiments of the present invention.

FIG. 6 depicts a functional block diagram of an embodiment of an instruction-execution/computing system 600 that may implement or embody embodiments of the present invention. As illustrated in FIG. 6, a processor 602 executes software instructions and interacts with other system components. In an embodiment, processor 602 may be a general purpose processor such as (by way of example and not limitation) an AMD processor, an INTEL processor, a SUN MICROSYSTEMS processor, or a POWERPC compatible-CPU, or the processor may be an application specific processor or processors. Storage device 604 may be a hard disk drive and/or another device capable of storing data, such as a magnetic or optical media (e.g., diskettes, tapes, compact disk, DVD, and the like) drive or a solid-state memory device. Storage device 604 may hold programs, instructions, and/or data for use with processor 602. In an embodiment, programs or instructions stored on or loaded from storage device 604 may be loaded into memory 606 and executed by processor 602. In an embodiment, storage device 604 holds programs or instructions for implementing an operating system on processor 602. In one embodiment, possible operating systems include, but are not limited to, UNIX, AIX, LINUX, Microsoft Windows, and the Apple MAC OS. In embodiments, the operating system executes on, and controls the operation of, the computing system 600.

In an embodiment, computing system 600 provides the ability to communicate with other devices, other networks, or both. Computing system 600 may include one or more network interfaces or adapters 612, 614 to communicatively couple computing system 600 to other networks and devices. For example, computing system 600 may include a network interface 612, a communications port 614, or both, each of which are communicatively coupled to processor 602, and which may be used to couple computing system 600 to other computer systems, networks, databases, and/or devices.

In an embodiment, computing system 600 may include one or more output devices 608, coupled to processor 602, to facilitate displaying graphics and text. Output devices 608 may include, but are not limited to, a display, LCD screen, CRT monitor, printer, touch screen, or other device for displaying information. Computing system 600 may also include a graphics adapter (not shown) to assist in displaying information or images on output device 608.

One or more input devices 610, coupled to processor 602, may be used to facilitate user input. Input device 610 may include, but are not limited to, a pointing device, such as a mouse, trackball, or touchpad, and may also include a keyboard or keypad to input data or instructions into computing system 600.

In an embodiment, computing system 600 may receive input, whether through communications port 614, network interface 612, stored data in memory 604/606, or through an input device 610, from a video camera, camera, scanner, copier, facsimile machine, or other computing device.

One skilled in the art will recognize no computing system is critical to the practice of the present invention. One skilled in the art will also recognize that a number of the elements described above may be physically and/or functionally separated into sub-modules or combined together.

It shall be noted that embodiments of the present invention may further relate to computer products with a computer-readable medium that have computer code thereon for performing various computer-implemented operations. The media and computer code may be those specially designed and constructed for the purposes of the present invention, or they may be of the kind known or available to those having skill in the relevant arts. Examples of computer-readable media include, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices. Examples of computer code include machine code, such as produced by a compiler, and files containing higher level code that are executed by a computer using an interpreter. Embodiments of the present invention may be implemented in whole or in part as machine-executable instructions that may be in program modules that are executed by a computer. Examples of program modules include libraries, programs, routines, objects, components, and data structures. In distributed computing environments, program modules may be physically located in settings that are local, remote, or both.

While the invention is susceptible to various modifications and alternative forms, specific examples thereof have been shown in the drawings and are herein described in detail. It should be understood, however, that the invention is not to be limited to the particular forms disclosed, but to the contrary, the invention is to cover all modifications, equivalents, and alternatives falling within the scope of the appended claims.

I claim:

1. A video encoding system comprising
a reference decoder comprising at least one buffer to constrain bitstream data by setting an available bitrate based on an amount of data stored within the at least one buffer;
a rate quantization model module, coupled to receive the available bitrate and a global edge strength value of an intra-coded video frame (I-frame) indicative of the magnitude of edges within the I-frame, the rate quantization model module selects a preferred set of quantization parameters for the video frame from a plurality of sets of quantization parameters based on the available bitrate and the global edge strength value only, said selection is made only on a frame basis;
a video encoder, coupled to receive the preferred set of quantization parameters, the video encoder performs a quantization operation in accordance with the preferred set of quantization parameters during an encoding procedure of the I-frame.

2. The video encoding system of claim 1 further comprising a preprocessor, coupled to communicate with the rate quantization model module, the preprocessor generates the global edge strength value during preprocessing of the I-frame.

3. The video encoding system of claim 2 wherein the global edge strength value is generated using a Sobel Edge Strength analysis of the I-frame.

4. The video encoding system of claim 1 wherein the video encoder operates in accordance with the H.264 international video codec standard.

5. The video encoding system of claim 1 wherein the rate quantization model module employs a sequential search to select the preferred set of quantization parameters from a plurality of sets of quantization parameters.

6. The video encoding system of claim 1 wherein the rate quantization model module employs an iterative search to select the preferred set of quantization parameters from a plurality of sets of quantization parameters.

7. The video encoding system of claim 1 wherein the rate quantization model module comprises:
a frame size interface on which an available bitrate is received;
an edge strength interface on which a global edge strength value is received; and
a quantization parameter processor, coupled to receive the available bitrate and the global edge strength value, the quantization parameter processor selecting the preferred set of quantization parameters based on the available bitrate and the global edge strength value.

8. The video encoding system of claim 7 wherein the rate quantization model module further comprises a memory, coupled to the quantization parameter processor, the memory stores a plurality of sets of quantization parameters.

9. The video encoding system of claim 8 wherein the preferred set of quantization parameters is selected from the plurality of sets of quantization parameters.

10. A method for encoding an I-frame, the method comprising:
receiving an available bitrate;
receiving a global edge strength value indicative of the magnitude of edges within the I-frame;
selecting a preferred set of quantization parameters from a plurality of sets of quantization parameters based on an analysis of the available bit rate and the global edge strength value only, said selection is made only on a frame basis; and
performing a quantization process on at least one block within the I-frame in accordance with the preferred set of quantization parameters.

11. The method of claim 10 further comprising the step of generating the global edge strength value during a preprocessing operation on the I-frame.

12. The method of claim 11 wherein the global edge strength value is generated using Sobel Edge Strength analysis.

13. The method of claim 10 wherein the I-frame is encoded in accordance with H.264 standard.

14. The method of claim 10 wherein a sequential search is used to select the preferred set of quantization parameters from the plurality of sets of quantization parameters.

15. The method of claim 10 wherein an iterative search is used to select the preferred set of quantization parameters from the plurality of sets of quantization parameters.

16. The method of claim 10 wherein the available bitrate is received from a reference decoder and relates to a maximum allowable frame size.

17. A rate quantization processor comprising:
a frame size interface on which an available bitrate is received;
an edge strength interface on which a global edge strength value, indicative of the magnitude of edges within the I-frame, is received; and
a quantization parameter processor, coupled to receive the available bitrate and the global edge strength value, the quantization parameter processor selecting the preferred set of quantization parameters based on the available bitrate and the global edge strength value only, said selection is made only on a frame basis.

18. The processor of claim 17 wherein the rate quantization module further comprises a memory, coupled to the quantization parameter processor, the memory stores a plurality of sets of quantization parameters.

19. The processor of claim 17 wherein the edge strength interface further receives a faint edges value indicative of faint edges being present within the I-frame.

20. The processor of claim 17 wherein the faint edges value indicates that compensation is to be performed to account for faint edges within the I-frame.

21. The system of claim 1, wherein the I-frame includes multiple macroblocks, and the global edge strength value is based on an average edge strength magnitude value of the multiple macroblocks comprising the I-frame.

22. The system of claim 21, wherein the global edge strength value of the I-frame is the sum of the average edge strength value of the multiple macroblocks in the I-frame.

23. The system of claim 5, wherein the sequential search for the preferred set of quantization parameters comprises setting an initial frame size and determining a quantization parameter corresponding to the initial frame size, and determining a difference of frame size relative to a target frame size, and sequentially calculating differences of frame size for successive values of all quantization parameters relative to the target frame size, and the preferred set of quantization parameters corresponds to the quantization parameters providing a smallest minimal difference of frame size relative to the target frame size.

24. The system of claim 6, wherein the iterative search for the preferred set of quantization parameters comprises comparing a first calculated frame size of a first indexed quantization parameter with a second calculated frame size of a second indexed quantization parameter in pairs, iteratively setting a new boundary index resulting from the comparison of calculated frame sizes using the first and second indexed quantization parameters, iteratively comparing calculated frame size in relation to a frame size calculation using quantization parameters corresponding to the new boundary index and selecting one of the indexed quantization parameters as an optimal indexed value depending on the calculated frame sizes, as the preferred set of quantization parameters.

* * * * *